Feb. 16, 1943.   F. C. GEIBIG   2,311,223
PORTABLE BLOWPIPE MACHINE
Filed April 24, 1940   4 Sheets-Sheet 1
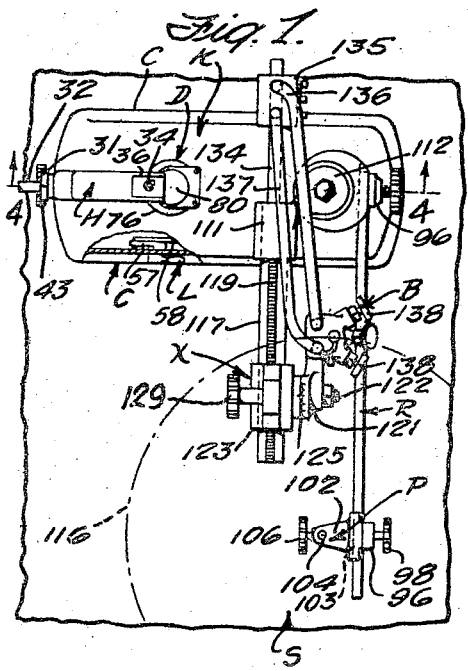
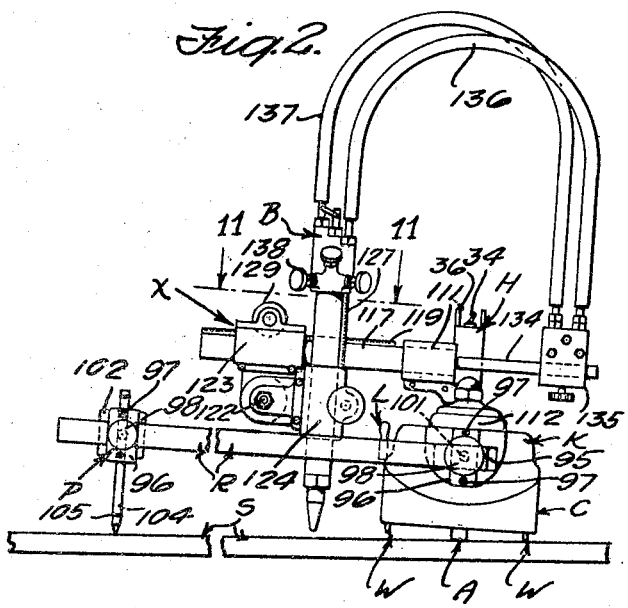
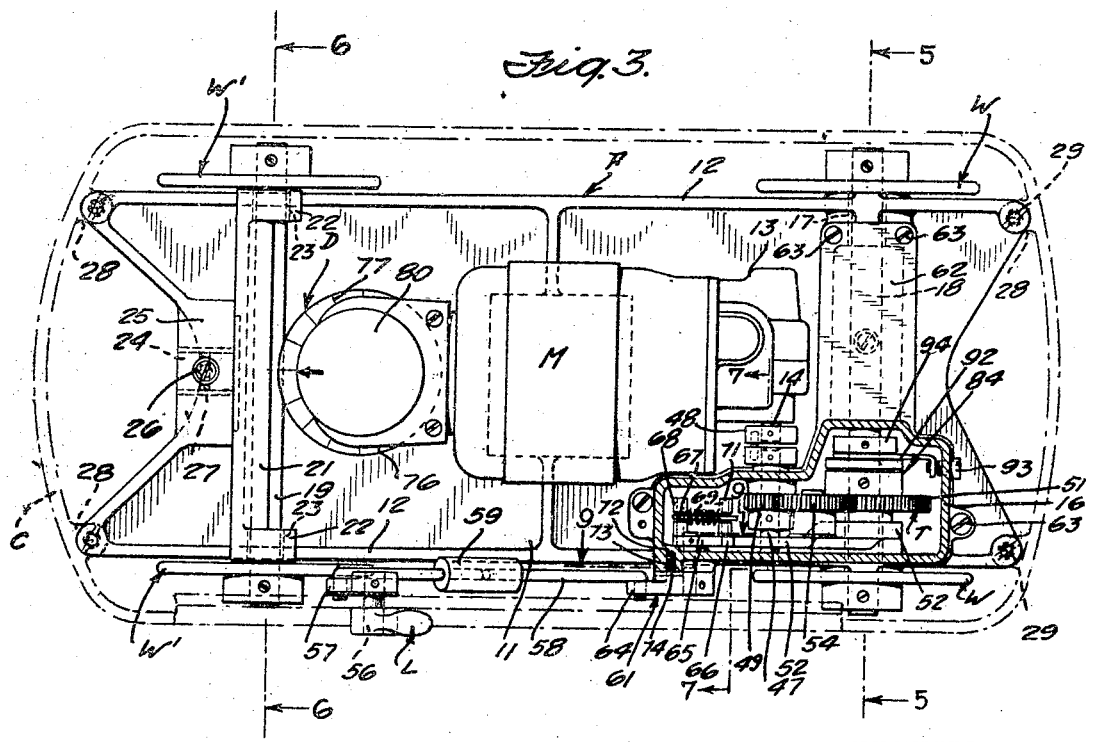
INVENTOR
FRANK C. GEIBIG
BY
F L Greenewald
ATTORNEY

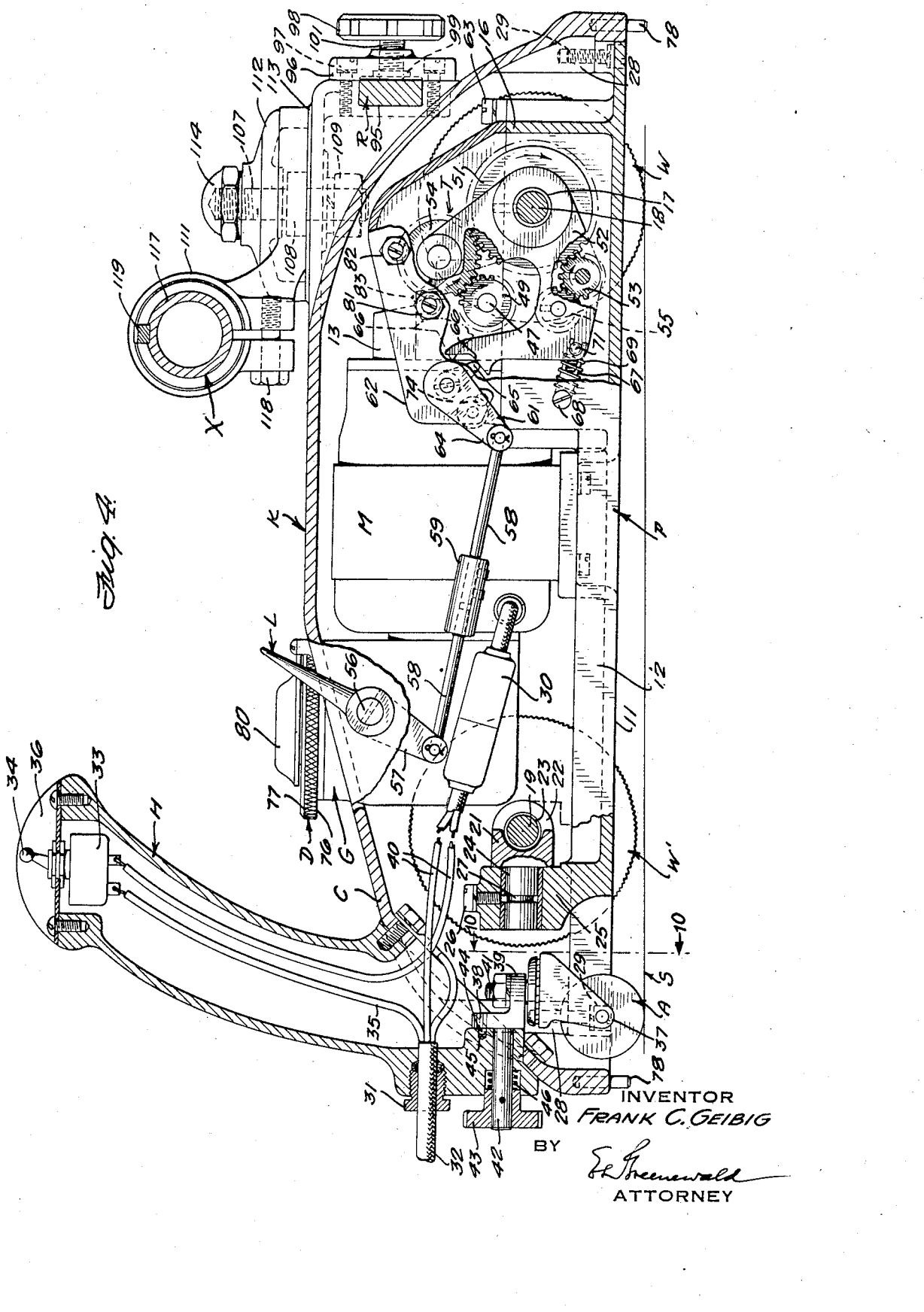

Feb. 16, 1943.    F. C. GEIBIG    2,311,223
PORTABLE BLOWPIPE MACHINE
Filed April 24, 1940    4 Sheets-Sheet 3
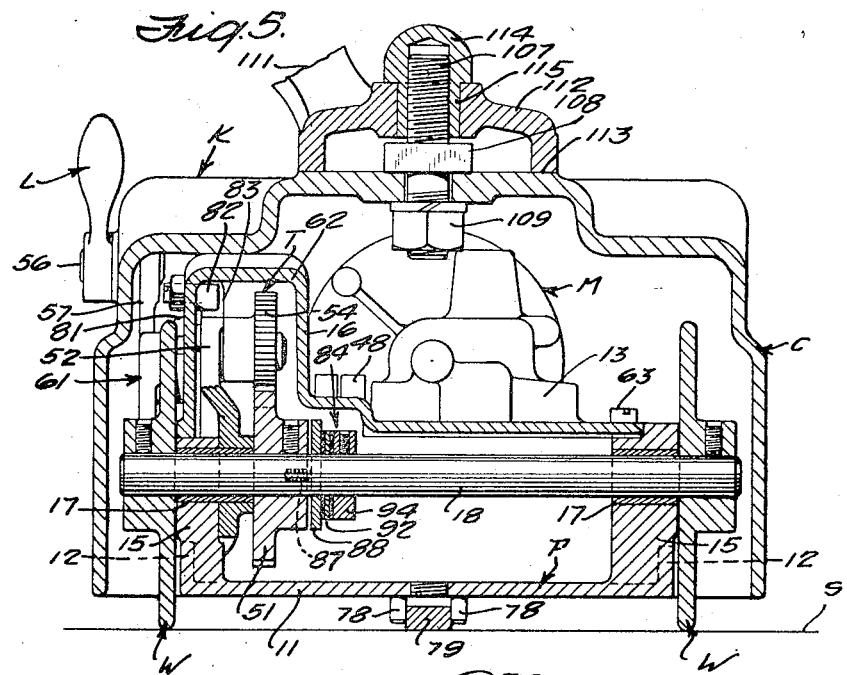
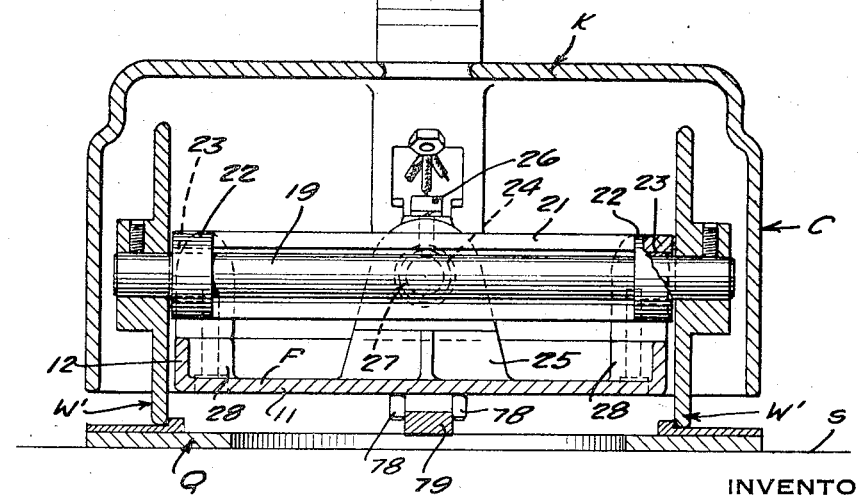
INVENTOR
FRANK C. GEIBIG
BY
ATTORNEY Feb. 16, 1943.  F. C. GEIBIG  2,311,223
PORTABLE BLOWPIPE MACHINE
Filed April 24, 1940  4 Sheets—Sheet 4
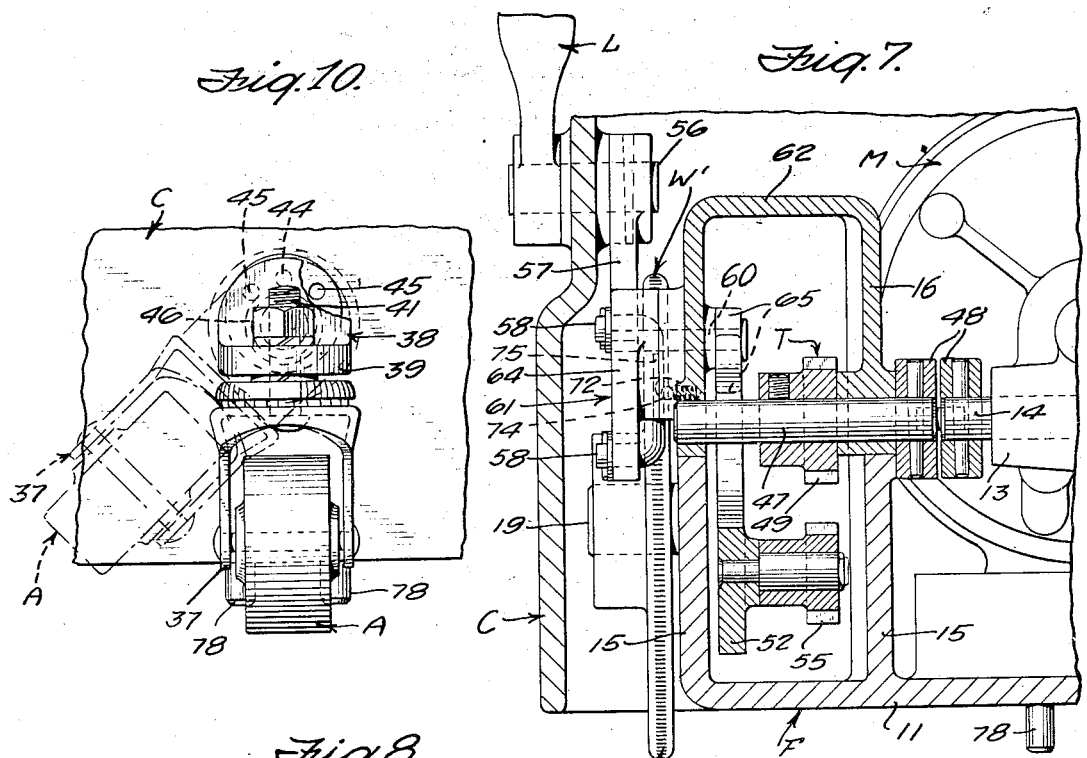
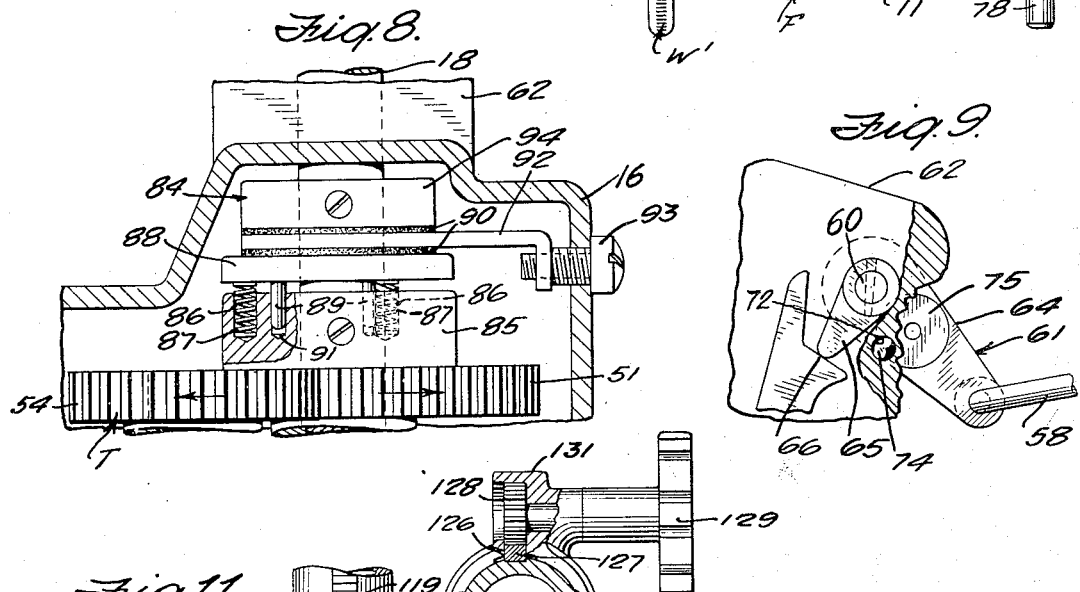
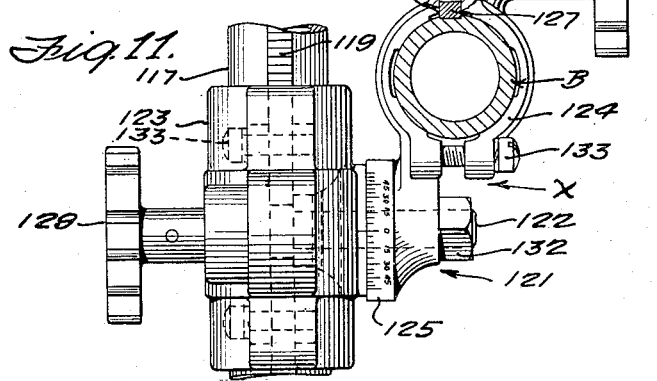
INVENTOR
FRANK C. GEIBIG
BY
ATTORNEY Patented Feb. 16, 1943

2,311,223

UNITED STATES PATENT OFFICE 2,311,223

PORTABLE BLOWPIPE MACHINE

Frank C. Geibig, Westfield, N. J., assignor to Union Carbide and Carbon Corporation, a corporation of New York Application April 24, 1940, Serial No. 331,314

16 Claims. (Cl. 266—23)

This invention relates to a portable machine for propelling a tool along a desired path of travel and more particularly to a self-propelled machine for supporting a cutting or welding blowpipe or similar tool.

Portable blowpipe machines are extensively used in steel fabricating mills and generally by machinists for performing a number of useful operations. Such machines may be employed in conjunction with a welding, cutting, desurfacing, or deseaming blowpipe to perform various metal-removing or welding operations by propelling the machine along the surface of a metal body in order that it may apply the blowpipe jets to successive portions of the body. Such a machine may otherwise support and propel a heating head along an edge or surface of the body of metal to impart a heat treatment thereto.

In performing metallurgical operations with a portable blowpipe machine, and especially when performing flame-cutting operations, it is essential that the flame-cutting blowpipe be positioned accurately with respect to the work, that the blowpipe motion be uniform, and that the rate of travel be capable of accurate regulation. A machine having these characteristics ordinarily involves elaborate and intricate mechanism, and costly manufacturing methods that contribute to make the machine so expensive as not to be available to many structural workers and machinists. Accordingly, it is the main purpose of this invention to provide a sturdy precision-built blowpipe machine which has simplified and improved design principles that materially reduce the manufacturing cost, thereby assuring availability of the machine in many new fields of application.

The principal objects of the present invention are to provide an improved self-propelled machine for supporting a cutting, welding, or heat-treating blowpipe, or similar tool; to provide in such a machine improved wheel-mounting means; to provide in such a machine an improved auxiliary support adapted to hold one or more of the carriage wheels out of rolling engagement with the work surface; to provide in such a machine an improved transmission system incorporating a simplified forward and reverse mechanism; to provide means for producing more uniform propulsion of the blowpipe by inhibiting backlash in the transmission gearing; to provide an improved handle or guiding means having a protected motor switch incorporated into the top of such handle; to provide improved means for attaching a radius rod to the carriage of the machine; and to provide means on the carriage for guiding the carriage along a strip located on the work surface. These and other objects of the present invention will become more apparent from the following description and from the accompanying drawings, disclosing a machine incorporating the novel principles of the present invention.

In the drawings, Fig. 1 is a plan view of the improved machine with the radius rod shown in operating position and with parts of the carriage broken away to illustrate portions of the reversing mechanism;

Fig. 2 is a front end view of the machine shown in Fig. 1, illustrating the arrangement of the parts during a circle cutting operation;

Fig. 3 is a plan view of the chassis as it appears when the carriage casing (shown in broken lines) is removed, certain portions of the transmission gear case being broken away to expose the gearing;

Fig. 4 is a longitudinal cross-sectional view of the machine taken on the line 4—4 of Fig. 1 with certain parts shown in elevation;

Fig. 5 is a vertical sectional view of the machine taken on the line 5—5 of Fig. 3, with a machine-guiding strip shown in operating position;

Fig. 6 is a vertical sectional view of the machine resting on a separate track member, taken on the line 6—6 of Fig. 3;

Fig. 7 is a detailed sectional view of the motor shaft and transmission, taken on the line 7—7 of Fig. 3;

Fig. 8 is an enlarged detailed view of the braking device shown attached to the front axle in Fig. 3;

Fig. 9 is a detailed sectional view taken on the line 9—9 of Fig. 3 disclosing the indexing means for the reversing mechanism;

Fig. 10 is a detailed view of the auxiliary support, taken on line 10—10 of Fig. 4; and Fig. 11 is an enlarged detail of the pivotal clamps forming the blowpipe bracket, taken on line 11—11 of Fig. 2.

The present machine is similar in some respects to the cutting and welding machine disclosed in Patent 2,183,605 dated December 19, 1939, but incorporates many new and useful features not disclosed in the patent. Generally speaking, the improved machine comprises a carriage K composed of a box-like casing C inverted over a chassis or frame F supported by a plurality of wheels W. A prime mover such as a motor M is mounted on the chassis F beneath the casing C and propels one or more of the wheels W by means of a gear transmission system T. An auxiliary support comprising a castor A, when lowered into operating position, raises one end of the carriage K and provides free-wheeling of the carriage in any direction over the work surface S as controlled by the handle H. The auxiliary support A also is employed in conjunction with a radius rod R and pivot point P for supporting the machine when it travels in circular paths. The forward and reverse motion of the machine is governed by the position of a forward and reverse lever L, and the carriage speed is controlled by means of a governor G having a speed-regulating dial D in an exposed positon on top of the casing C. A blowpipe or similar tool B is adjustably mounted on the carriage K by tool supporting means X.

The chassis F comprises a cast or built-up base or frame consisting essentially of a base plate 11 having upwardly extending flanges or walls 12 about the periphery thereof, forming a pan or reservoir adapted to catch lubrication drippings and the like. The base plate 11, and walls 12 cooperate with the casing C to form a substantially complete enclosure for the wheel mounting and motor-drive mechanism. The motor M which is mounted on a raised portion of the chassis F as shown in Figs. 3 and 4, preferably is provided with a built-in speed-reducing unit 13 from which the motor-drive shaft 14 projects in a horizontal direction. The chassis F is provided at its forward end with upwardly extending walls 15 which form the lower portion of an enclosed gear case 16 and which provide supports for the bushings 17 serving as bearings for a front axle shaft 18. The front wheels W are securely fastened to the opposite ends of the axle shaft 18. Transmission gearing T connects the drive shaft 14 with the axle shaft 18, as will be explained.

The rear end of the carriage K normally is supported by rear wheels W' which engage the work surface S when the auxiliary support A is in the upper or inoperative position. In order that the carriage K may be supported constantly by all four wheels, even when rolling on an uneven surface, the rear wheels W' are mounted for a predetermined amount of free vertical movement with respect to the carriage K. As best seen in Figs. 4 and 6, the rear wheels W' are secured to the ends of a rear axle shaft 19 which is rockably mounted about a horizontal axis, as by a pivotal yoke 21. The yoke extends transversely of the carriage in a generally horizontal direction, and forwardly extending ears or lugs 22 at opposite ends of the yoke are apertured to receive bearings 23 within which the horizontally extending axle shaft 19 is journalled. The yoke 21 is pivotally supported at an intermediate point, preferably adjacent to the mid-section by a rearwardly extending swivel pin 24 journalled within a pedestal 25, whereby the axle 19 may rock in a vertical plane about a horizontal axis extending longitudinally of the carriage K. A retaining screw 26 cooperates with a groove 27 in the pin 24 to inhibit axial movement of the pin 24. Accordingly, when the carriage K travels along a work surface S the respective wheels W' may rise and fall in accord with irregularities in the work surface as the axle shaft 19 rocks about the pin 24.

The inverted hollow casing C, which may be stamped of light-sheet metal or cast from iron or aluminum, preferably is provided with downwardly sloping front and rear portions to decrease the weight, reduce the size and exposed area of the carriage K, and improve the appearance of the machine. A plurality of lugs 28, preferably formed integrally with the depending end walls of the casing C, rest upon the chassis F and support the casing in its correct position above the chassis. Substantially all of the moving parts are mounted directly on the chassis F free of the casing C so that by slight manipulation the casing C may be lifted directly from the chassis to expose the running parts for adjustment or repair. A plurality of machine screws 29 detachably secure the casing C to the chassis F, as shown in Figs. 3 and 4.

A hollow handle H extends upwardly and forwardly from the rear portion of the casing C and forms a handgrip, useful in carrying the machine about and in guiding the machine over the work surface S. A conduit clamp 31 (Fig. 4), comprising a bushing threaded in an opening at the base of the handle H, is adapted to hold an electrical supply conduit 32 firmly to the carriage. Motor control means, such as an electric switch 33, is supported at the top of the handle H with the operating means or lever 34 extending upwardly from the top of the handle. Wire 35 from the supply conduit 32 extends through the hollow handle H and connects with the switch 33. Wires 40 extend from a wire connector 30, and operatively connect the motor M with the source of supply and with switch 33 respectively. Accordingly, when the operator grasps the handle H the switch 33 may be operated by a slight forward and backward movement of the operator's thumb to start and stop the motor. Protecting means or switch guards such as substantially parallel plates 36 extends upwardly from the top of the handle closely adjacent to the switch-operating means 34 and protect the latter. As shown in the drawings, the plates 36 may comprise the flanges of a channel member which closes the top of the handle H and supports the switch 33, which channel naturally guides the operator's thumb during forward and backward manipulation of the lever 34.

When the four wheels W and W' are in rolling engagement with the work surface S, the carriage is ordinarily limited in its travel to substantially straight line motion along the surface. By raising the two rear wheels out of operative engagement with the supporting surface, and substituting a single centrally located caster, forming the auxiliary support A, the carriage may be moved in different directions over the work surface S in response to the operator's control of the handle H. The auxiliary support also is useful when locating the carriage in the initial operating position, and when the machine is guided in a circular path by the radius rod R.

The auxiliary support A, disclosed in Figs. 4 and 10, is mounted at the rear end of the carriage K, that is, the end opposite the motor-driven wheels W, and comprises a swiveled caster 37, preferably pivoted about a horizontal axis directly to the casing C by means of a pivotal retractor 38 having a generally horizontal rod 42 slidably and pivotally extending through the portion of the casing C formed by the base of the handle H. A bracket 39 is attached to the inner end of the rod 42 to receive the vertical pintle 41 of the caster 37. A knob 43 is secured to the outer end of the rod 42 for pivotally raising the caster 37 from the lower operating position shown in Fig. 4 to an upper position at which the caster no longer operatively engages the work surface.

Means may be provided to lock the caster in both the upper and lower positions. The locking means may comprise a pin and socket arrangement composed, for example, of a pin 44 extending horizontally from the bracket 39, and sockets 45 located in the casing C so as to engage the pin 44 when the caster is in the lower and upper positions, respectively. A compression spring 46 acting between the knob 43 and the casing C urges the rod 42 outwardly and causes the pin 44, when properly aligned, to enter the respective sockets 45. The caster 37 may be retracted from the lower position shown in Fig. 4 by momentarily depressing the knob 43 inwardly to compress the spring 46 until the pin 44 is clear of the socket 45, and by rotating the knob in either direction to raise the caster. When the caster has been pivoted upwardly through a predetermined arc, as shown in broken lines in Fig. 10, the pin 44 becomes aligned with another of the sockets 45, and when the knob is released the rod 42 is urged outwardly by the spring 46, causing the pin 44 to enter the socket and sustain the caster in the upper or retracted position. The foregoing series of operations is effected in reverse order when it is desired to lower the caster. The front wheels W and either the rear wheels W' or the auxiliary support A always are in operative engagement with the work surface S so that the carriage K is at all times stably supported.

The transmission mechanism T comprises speed-reducing gear means for connecting the motor-drive shaft 14 with the axle shaft 18, with additional provision for reversing the direction of rotation. The built-in speed-reducing unit 13 causes the shaft 14 to rotate at a speed considerably lower than the speed of the armature of the motor M. A countershaft 47 is journalled in the sides of the gear case 16, in axial alignment with the drive shaft 14, the adjoining ends of the shafts 14 and 47 being connected by means of a flexible coupling 48, as shown in Figs. 3 and 7. A small driving gear 49 is secured on the counter-shaft 47 within the gear case 16. A relatively large gear 51 is secured to the axle shaft 18, and is located within the gear case 16 substantially aligned with the gear 49 but in separated non-meshing relation with respect thereto.

A forward-and-reverse pinion support 52 is movably mounted within the gear case 16 so as to shift one or more connecting pinions into selective engagement with the gears 49 and 51, to transmit rotary motion from the shaft 14 to the axle shaft 18. Preferably the pinion support 52 forms part of a toggle joint that pivots about the axis of one of the gears 49, or 51. As shown in Figs. 3 and 4, the support 52 comprises a plate-like member journalled to the shaft 18 to pivot about the axis of gear 51. A first planetary pinion 53 and a second planetary pinion 54 are rotatably mounted in spaced relation on the support 52, each in meshing engagement with the gear 51 at separated portions of its periphery. As the support 52 pivots about the shaft 18, the planetary pinions 53 and 54 partially revolve about the gear 51. An idler pinion 55 is rotatably mounted upon the support 52 in meshing engagement with the first planetary pinion 53 at a point spaced from the periphery of the gear 51. The pinions 54 and 55, respectively, are adapted to engage the gear 49 when the support 52 is pivoted in opposite directions about the shaft 18. Preferably both pinions 54 and 55 rotate about axes spaced substantially the same distance as shaft 47 from the center of the shaft 18. By this arrangement the pinions 54 and 55 during shifting operations approach and leave the small gear 49 in a direction that substantially coincides with the line of centers between the gear 49 and the respective pinions, thus facilitating the engagement of gear teeth. When the support 52 is rocked or pivoted in a counterclockwise direction about shaft 18 to the position shown in Fig. 4, the planetary pinion 54 connects the gears 49 and 51, to provide clockwise rotation of the shaft 18 when the gear 49 is rotating in a clockwise direction. By rocking the support 52 in a counter-clockwise direction from the position shown in Fig. 4, pinion 54 is disengaged from the gear 49, and immediately thereafter the idler pinion engages the gear 49, in which case transmission of motion is effected from the gear 49 through pinions 55 and 53 to the gear 51. The idler gear 55 operates to reverse the direction of motion of the wheels W, so that in the latter position the shaft 18 rotates in a counter-clockwise direction when the gear 49 rotates in a clockwise direction.

Forward and reverse shifting mechanism to rock or pivot the support 52 comprises a lever L, pivoted to the side of the casing C, as shown in Figs. 1, 4, and 5. A fulcrum pin 56, journalled in the casing C, connects the lever L with a lever 57 depending from the pin 56 within the casing C. A connecting rod 58 provided with a coupling 59 extends from the lever 57 to a bell crank 61, pivotally mounted as by means of pin 60 to the side wall of a cover 62 for the gear case 16. The cover 62, which is held in place by screws 63, forms a substantially fluid tight closure for the gear case 16, so that the latter may contain a liquid lubricant. The bell crank 61 consists of a lever 64 external of the gear case 16, and a shifting element 65 located within the case 16 and adapted to cooperate with a notched portion 66 of the pinion support 52.

A toggle lever 67 is operatively connected between the gear case and the support 52 to shift the support about the axis of the shaft 18 to predetermined operating positions whenever the support 52 is moved past an intermediate dead-center position by the shifting element 65. The toggle lever 67 preferably is pivoted to a stand-off 68 projecting within the gear case 16 as shown in Fig. 3. A spring 69 is compressed between the stand-off 68 and a toggle pin 71 extending inwardly from the pinion support 52. When the lever L is pivoted rearwardly from the forward position shown in Fig. 4, the shifting element 65 pivots in a counterclockwise direction, thereby lifting the free end of support 52. As the toggle lever 67 is moved past the dead-center position, the expanding tendency of the spring 69 shifts the support 52 upwardly until the portion 66 reaches the position shown in broken lines in Fig. 4, in which position the reversing idler pinion 55 engages the gear 49.

Although the pivotal motion of the pinion support 52 is limited in either direction by the engagement of gear 49 with pinion 54 or 55, more efficient gear functioning may be obtained by providing separate limiting means for properly positioning the respective gears. As shown in Figs. 4, and 5, eccentric stops 81 and 82 may project inwardly from the cover 62 so as to engage a projection 83 on the support 52, to accurately locate the parts in the predetermined operating positions. The pinions 53 and 55 used in obtaining reverse drive are shown to be smaller than pinion 54 employed in the forward drive, but the resulting carriage speed is the same in either direction, provided that the gear 49 rotates at the same speed.

It will be observed that when the pinion support is held at an intermediate or dead-center position, neither of the pinions 54 and 55 engages the gear 49, the gears being in a neutral position wherein the front wheels W are disconnected from the gear 49, the carriage K then being freely movable over the work surface. Means are provided for holding the support 52 at the dead-center or neutral position. As shown in Figs. 3 and 9, an indexer may be provided in conjunction with the bell crank 61 to hold the parts in neutral position when the lever L is shifted to a point halfway between the forward and reverse positions. The indexer may comprise a cavity 72 formed in the gear case 16, which cavity is adapted to receive a compression spring 73 and a small hardened steel ball 74. The inner adjoining face of the lever 64 may be counterbored to receive a hardened steel washer 75 formed of relatively thin sheet material, the washer being so located on the lever 64 that the ball 74 is urged into engagement with the small central aperture of the washer when the lever 64 is located in the intermediate or neutral position. Accordingly, when the lever L is shifted from either the forward or reverse positions, the lever 64 indexes by the engagement of the ball 74 with the washer 75 at the time that the shifting mechanism reaches the neutral position. The force of the spring 73 applied to the ball 74 is sufficient to hold the parts in the neutral position against any tendency of the toggle lever to shift the support 52 to either of the operating positions. However, as soon as the lever L forces the lever 64 slightly from the indexed position, the toggle lever is operative to complete the shifting action.

Heretofore it has been customary to employ speed-change gearing or its equivalent in the transmission mechanism of portable blowpipe machines. The present machine employs an improved type of governor G, secured at the end of the motor opposite the speed-reducing unit 13. The governor G which operates efficiently over a wide range of speeds, incorporates electrical make-and-break contacts for controlling the motor circuit, which contacts are actuated in response to electromagnetic forces generated by the motor armature. A governor of this type is fully disclosed and claimed in application Serial No. 258,354, filed on February 25, 1939, by Frank C. Geibig and Stanley H. Royer, now Patent 2,228,625. The improved governor G provides carriage speeds of from 4 to 70 inches per minute—a speed range considerably in excess of that produced by other types of governors—and thus dispenses with the unusual speed change gearing. However, the present machine will function in a satisfactory manner irrespective of what type of governor is employed to control the motor speed. As herein disclosed the upper portion of the governor G projects through the casing C and is provided with a rotatable dial D comprising a speed-control disk 76 having a graduated dial 77 on its upper surface to indicate the carriage speed. A cap 80 covers a portion of the dial D and is detachably mounted to the casing C. Both the cap 80 and dial D may be removed to permit the casing C to be lifted from the chassis F.

Although the carriage K travels in substantially a straight line when rolling on the four wheels W and W', a pair of carriage-guiding elements 78 may be provided at each end of the carriage to cooperate with a guide strip or track for positively controlling the direction of the carriage motion. As indicated in Figs. 4, 5, and 6, the elements 78 may comprise laterally spaced pins projecting downwardly from the rim of the casing C at each end thereof, preferably on opposite sides of the central vertical plane extending longitudinally of the carriage K. The elements 78 extend downwardly into juxtaposed relation with the work surface S or with a track member Q as shown in Fig. 6, and are adapted to embrace the sides of a guide strip 79 extending longitudinally beneath the machine. The auxiliary support A must be raised to the upper position if the support interferes with the strip, to thereby allow the machine to be guided by the cooperative relation between the elements 78 and the strip 79. Although intended primarily for directing the machine in straight paths, the elements 78 may nevertheless cooperate with a guide strip 79 describing a circular or other contour.

As previously pointed out, it is important that the blowpipe or other tool be propelled along the work surface at a uniform speed. The motion imparted to the carriage K from motor M and transmission gearing T ordinarily is sufficiently uniform, provided the driving action is effected continuously in a single direction. For example, when the carriage K is propelled over a horizontal work surface or up a slight incline, the governor-controlled motor maintains a uniform driving action on the carriage. However, when the carriage passes the summit of a slight incline in the work surface S, the tendency of the carriage to roll down the incline causes the gearing to take up backlash in all gears, thereby introducing extraneous motion in the wheels which results in momentarily accelerating the blowpipe travel. The slight momentary increase in blowpipe speed often is of sufficient proportions to produce a material defect in the work, and in the case of flame-cutting or beveling may result in loss of the cut, or in the formation of a mark or groove that frequently cannot be removed. In the present machine, extraneous motion in the carriage wheels resulting from backlash in the gearing has been overcome by frictional braking means 84.

The braking means 84, shown in Figs. 5 and 8, comprises generally a first braking member rotatable with the axle or wheel, a second braking member supported by the carriage adjacent to the first braking member, and resilient means for urging the respective members into frictional contact. The parts may be arranged in any way desired, the object being frictionally to retard the rotation of the wheel or axle. As shown in Fig. 8 the hub 85 of the gear 51 is provided with a plurality of recesses 86 extending parallel with the main bore of the gear 51, which recesses are adapted to receive compression springs 87 projecting slightly beyond the face of the hub 85. The first braking member comprises an apertured braking disk 88, slidably mounted on the shaft 18 adjacent to the hub 85. In order that the disk 88 may rotate with the shaft 18, a plurality of pins 89 project from the face of the disk 88 for slidable engagement with bores 91 in hub 85. The second braking member comprises a braking plate 92 supported adjacent to the disk 88 and held against rotation by screw 93 extending through the wall of gear case 16. Preferably the plate 92 comprises an apertured bracket of sheet metal surrounding the shaft 18 and frictionally engaging the disk 88, by opposing the expanding tendency of the springs 87. The braking action between the disk 88 and the plate 92 may be rendered more positive by backing up the plate 92 with a collar 94, secured to the shaft 18 on the side of the plate 92 opposite the disk 88. Accordingly the braking plate 92 is clamped between the disk 88 and the collar 94 by the force of the springs 87, thereby frictionally retarding the free rotation of the shaft 18 and of the front wheels W. Brake lining 90 may be inserted between the braking members to provide smoother action.

The frictional action may be adjusted by varying the axial position of the collar 94, the friction being decreased as the collar 94 is moved further from the hub 85. The collar 94 is adjusted so that the friction created by the braking means 84 is insufficient to materially burden the motor M in propelling the carriage K, but is sufficient to overcome the tendency of the carriage K to roll down slight inclines or slopes. The slopes encountered in most work result from undulations appearing in the surface of rolled sheet or plate, and ordinarily do not exceed several degrees from the horizontal. By adjusting the braking means 84 to prohibit free rolling of the carriage along such slopes, the extraneous motion between the gear driving mechanism and the driving wheels produced by backlash in the gearing is dampened out or inhibited, and the machine is driven continuously and smoothly by the motor M. The braking means 84 does not materially detract from the free-wheeling operation of the machine when the gears are in the neutral or disconnected position.

The radius rod R, shown in Figs. 1 and 2, preferably comprises a substantially rigid bar of rectangular cross section detachably secured to the carriage K. As shown in Figs. 2 and 4, the carriage K preferably is provided at one end with a generally horizontal groove 95 adapted to receive the radius rod R. The groove 95 may be cast or machined in the end wall of the casting C, to smoothly receive the rod R. Detachable means such as a cover plate 96, extending across the groove 95, is held in place by screws 97. The cover plate 96 is apertured and threaded to receive the threaded stem 101 of thumb screw 98. The inside face of the cover plate 96 is counter-bored adjacent to the threaded aperture, to provide a recess 99 for accommodating the peened-over portion that forms at the end of the stem 101 from repeated use. The cover plate 96 normally is held against the casing C as shown in Fig. 4, and the rod R is inserted endwise within the groove 95 and locked in place by thumb screw 98. The radius rod holding means thus comprises an easily formed and easily machinable groove 95, having a separate cover plate 96, providing an economical and sturdy support.

The pivot point P comprises a bracket 102 provided with a groove 103 similar to groove 95, substantially of the configuration of the cross-section of radius rod R. The bracket 102 is provided with a cover plate 96 held to the bracket by screws 97 and having a threaded bore to receive a thumb screw 98, all substantially identical with corresponding members previously described. The bracket 102 is slidable along the radius rod R to any desired position and may be locked in place by the thumb screw 98 on the bracket 102. A pivot pin 104 extends downwardly from the bracket 102 in offset relation to the rod R, preferably so as to be aligned with the blowpipe B and with the driving axle when the parts are arranged as shown in Fig. 1. Split retaining rings 105 at the top and bottom limit the vertical sliding movement of the pin 104 within the bracket 102, and a thumb wheel 106 secures the pin 104 in any desired position.

The support X for the blowpipe or other tool preferably is pivotally mounted on top of the casing C. As shown in Figs. 4 and 5, the top of the casing C is apertured at the front end of the machine to receive a mounting post 107 which may consist of a centrally flanged bolt 108 projecting downwardly through the casing C, the bolt being held thereto by nut 109. A cup-shaped or concave body 112, apertured opposite its open end, is inverted on the post 107 so that the rim 113 lies flat against the top of the casing C. The horizontally extending tool clamp or cross-arm clamp 111 is secured to the body 112 in offset relation thereto. A crown nut 114 having a depending sleeve portion 115 holds the hollow body 112 against the casing C to firmly locate the tool clamp 111 in predetermined position whenever the nut 114 is tightened, and to permit the clamp 111 to swivel about the sleeve portion 115 whenever the nut 114 is loosened sufficiently. The concave or hollow body 112 provides a substantial degree of resilience to the mounting, so that when the nut 114 is tightened appreciably the tool clamp 111 may be shifted manually from one position to another, in opposition to the frictional force applied by the nut 114, which force ordinarily is sufficient to hold the clamp 114 in any predetermined position during operation of the machine. The clamp 111 preferably forms an integral part of the body 112 and is adapted to receive a tool such as a horizontally extending blowpipe, or a tool-supporting arm such as cross arm 117. A clamping screw 118 holds the cross arm 117 within the clamp 111.

The cross arm 117 may comprise a tubular member, preferably of the same diameter as the blowpipe B, provided along its upper portion with a longitudinally-extending rack 119. A blowpipe bracket 121, best seen in Fig. 11, comprises two identical clamps 123 and 124, pivotally mounted at right angles to one another by a pivot screw 122. A protractor scale 125 having an index mark cooperative therewith assists in determining the angular relation of the clamps with respect to one another about the axis of the screw 122, which scale preferably indicates zero when the clamps are at right angles to one another. The clamp 124 is provided with a recess 126 to accommodate a rack 127 extending longitudinally of the blowpipe body B. The clamp 123 is provided with a similar recess to accommodate the rack 119. Each clamp 123 and 124 is provided with a pinion 128 mounted for operative engagement with the racks 119 and 127 respectively; each pinion 128 may be rotated by means of an adjusting knob 129 to shift the parts as desired. A guard 131 serves as a protection for each of the pinions 128. With the arrangement shown, the clamp 123 may be shifted transversely of the carriage K by manipulating the associated knob 129. The blowpipe B is angularly adjusted with respect to the work surface by shifting clamp 124 about screw 122 to the desired angle, and then tightening nut 132. The blowpipe may be shifted axially within clamp 124 by means of the associated knob 129. If desired, machine screws 133 may be provided on both clamps 123 and 124 to lock the parts in the desired position.

An extension arm 134 projects from the cross arm 117 as shown in Fig. 2 to receive hose connecting means 135 such as a hose clamp or valve body. Short lengths of hose 136 and 137 extend from the hose connecting means 135 to the inlet connections of the blowpipe B, which hoses supply the blowpipe with oxygen and combustible gas respectively. Valves 138 may be provided at the blowpipe or may be attached to the hose connecting means 135, to control the flow of gases.

To operate the machine so as to flame-sever a plate along a straight line, a guide strip 79 is first secured in parallel relation to the desired path, the strip being secured either directly to the plate being severed, or to a suitable intermediate track Q which may rest on the plate. With the caster 37 in the upper position, the machine is placed over the guide strip so that the guiding elements 78 straddle the sides of the strip 79. The conduit 32 is connected with a suitable source of supply and the lever L is located in the neutral position. The cutting blowpipe B is then properly positioned with respect to the work surface, the operating speed of the machine adjusted by means of the dial D, and the preheating mixture of the blowpipe B adjusted and ignited. When the starting zone is heated to the ignition temperature, the cutting oxygen valve is opened and the lever L shifted to connect the front wheels W with the motor M, thereby propelling the blowpipe in a path parallel to the strip 79.

When it is desired to operate the carriage K in a circular path 116 (see Fig. 1), the auxiliary support A is first lowered into the surface-engaging position shown in Figs. 4 and 10 so that the machine is supported by both drive wheels W and the caster 37. The radius rod R is then mounted in position on the machine, and the pivot point P properly located by locking the bracket 102 on the rod R when the pin 104 is aligned with the center of rotation. The thumb wheel 106 is loosened and the pin 104 pressed against the work surface S while the operator lifts the projecting end of the radius rod R sufficiently to raise the inside drive wheel from the work surface, as shown in slightly exaggerated form in Fig. 2. The thumb wheel 106 is tightened, so that the carriage K is supported by the pin 104, the outside drive wheel W, and the caster 37. The cutting blowpipe B is then shifted along the arm 117 until the cutting orifice is properly aligned with the circular path 116, and the machine set in operation as previously described.

The casing C may be lifted from the chassis F upon removing the governor dial D and screws 29. If the casing C is to be completely removed, the connector 30 may be detached, and the screws of coupling 59 may be loosened to separate the rod 58, thus allowing complete separation of the casing from chassis. The chassis may be operated independently with the casing removed, as for testing purposes, by establishing an independent electrical connection to the motor M through connector 30. The direction of travel may be controlled by operation of lever 64, and the speed regulated by the dial D after it has been refastened on the governor G.

The machine may be modified in many respects without departing from the principles of the invention or sacrificing the advantages thereof.

I claim:

1. A machine for propelling a cutting or welding blowpipe or similar tool along a path of travel, comprising a wheel-supported carriage; tool-supporting means on said carriage; a handle projecting upwardly from said carriage and adapted to be grasped by the hand of an operator; an electric motor supported by said carriage and adapted to propel said carriage; an electric switch for said motor mounted within said handle; switch-operating means projecting upwardly from the top of said handle and movable in forward and backward directions so as to be operable by the thumb of the hand grasping said handle; and guard plates extending from said handle adjacent to said switch-operating means, to protect the latter, said guard plates forming a channel for guiding the motion of the thumb operating said switch.

2. An auxiliary support for a self-propelled blow-pipe-supporting carriage having two front wheels and two rear wheels adapted to support said carriage in rolling engagement with a work surface, said auxiliary support comprising a retractable caster on said carriage at one end thereof, said caster being adapted when in a lower position to swivel on said surface about a vertical axis and to support said carriage on said work surface with the adjacent pair of said wheels lifted from said work surface; and pivotal retracting means operable from a point outside of said carriage and adapted to pivot said caster about a substantially horizontal axis to an upper position out of operative relation with said work surface.

3. An auxiliary support as claimed in claim 2 wherein said retracting means comprises a generally horizontal rod journalled to said carriage about which rod said caster may pivot, and including means for locking said caster in the lower and upper positions respectively.

4. A machine for supporting a cutting or welding blowpipe or similar tool for movement along a work surface, comprising a carriage; a tool support on said carriage; two front wheels and two rear wheels for supporting said carriage in rolling engagement with said work surface; means on said carriage for driving at least one of said wheels; a retractable caster on said carriage at the end opposite such driven wheel, said caster being adapted when in a lower position to swivel about a vertical axis and to support such carriage on said work surface with the adjacent pair of said wheels lifted from said work surface; and pivotal retracting means adapted to pivot said caster about a substantially horizontal axis to an upper position out of operative relation with said work surface, said retracting means comprising a generally horizontal rod journalled to said carriage and attached to said caster, and pin and socket locking means operative between said carriage and said retracting means to hold said caster in upper and lower positions respectively, said pin and socket locking means being engageable and disengageable by axial motion of said rod.

5. A portable machine for propelling a blowpipe or other tool along a work surface, comprising a carriage; wheels adapted to support said carriage for travel directly along a work surface; power driving means supported by said carriage and adapted to drive at least one of said wheels; and a pair of carriage-guiding elements depending from said carriage at each end thereof, the elements of each pair being laterally spaced and extending into juxtaposed relation to said work surface.

6. A portable machine for advancing a blowpipe or other tool along a work surface, comprising a chassis; front and rear wheels on said chassis adapted to support said machine for rolling engagement with a work surface; a box-like casing inverted over said chassis; and machine-guiding elements comprising laterally spaced means depending from the front and rear ends of said casing into juxtaposed relation to said work surface, said means being adapted to engage the sides of a guide strip lying on said work surface and extending longitudinally beneath said machine.

7. A blowpipe-propelling machine comprising a carriage adapted to support a blowpipe; a rotatable drive axle; wheels secured to said drive axle; a gear secured to said axle; a motor on said carriage; transmission gearing operatively connecting said motor with said gear; and means for inhibiting irregular propulsion of said blowpipe along the desired path of travel occasioned by backlash motion in said gear and gearing occurring when said carriage is urged to roll faster than it is driven by said motor, said means comprising a first braking member rotatable with said axle, a second braking member supported by said carriage adjacent to said first braking member, and resilient means for urging said respective members into frictional contact to thereby retard the rotation of said axle.

8. A portable blowpipe-propelling machine, comprising a wheeled carriage adapted to support a blowpipe; a radius rod; a pivot point on said rod; a generally horizontal groove formed in one end of said carriage to receive said rod; and detachable cover plate means extending across said groove, said detachable means including a rod-engaging screw adapted to lock said rod in position within said groove.

9. A machine for supporting and propelling a blowpipe or similar tool, comprising a wheel-supported carriage having a box-like casing; a motor within said casing for propelling said carriage; and tool mounting means supported by said casing, said mounting means comprising a post projecting vertically upward from said casing, an apertured concave body inverted on said post, said body having a rim engaging the top surface of said casing, a tool-supporting arm mounted on said body and being rotatable with said body about said post, and means on the top of said post for clamping said body in predetermined position by forcing said rim against said casing.

10. In a machine for propelling a cutting or welding blowpipe or similar tool along a path of travel, in which said machine is provided with a wheel-supported motor-driven carriage, and tool-supporting means on the carriage, the combination comprising a handle projecting upwardly from said carriage and adapted to be grasped by the hand of an operator with the thumb of the hand projecting over the top of said handle, to guide said carriage; and motor control means projecting upwardly from the top of said handle positioned so as to form a rest for the operator's thumb and being operable by the thumb of the hand which grasps said handle.

11. Blowpipe mounting means for securing, to a movable carriage, a cylindrical blowpipe body of the type having a rack extending along said body, said means comprising a cylindrical arm of substantially the same diameter as said blowpipe body, said arm being adapted to extend from said carriage; a rack extending along said arm; and a blowpipe bracket adapted to secure said blowpipe to said arm, said bracket comprising a pair of mutually pivotally adjustable clamps each interchangeably mountable on said body and on said arm, each of said clamps being recessed to accommodate said respective racks, said brackets including two rotatable pinions, one carried by each of said clamps and operatively engageable with either of said racks, to adjust said bracket and said blowpipe in either direction along said arm and to raise and lower said blowpipe relatively to said bracket and said arm.

12. In a blowpipe-propelling machine having a carriage, a blowpipe support on said carriage, wheels for supporting said carriage, a motor having a drive shaft, and gearing adapted to transmit power from said drive shaft to at least one of said wheels; means for eliminating extraneous motion of said wheels resulting from backlash in said gearing whenever said carriage tends to roll at a speed above that produced by said motor, said means comprising a first braking member rotatable with at least one of said wheels, and a stationary braking member secured to said carriage for resilient engagement with said first braking member.

13. A blowpipe carriage comprising a pair of wheels journalled directly to said carriage adjacent to a first end thereof; an axle at the opposite end of said carriage extending from one side of said carriage to the other; wheels mounted at the extremities of said axle; means intermediate the extremities of said axle for supporting said axle on said carriage for rocking movement about a horizontal axis; and a blowpipe holder mounted on said carriage adjacent to said first end of said carriage.

14. A blowpipe carriage comprising a pair of wheels journalled to said carriage adjacent to a first end thereof; a generally horizontally extending yoke-shaped axle support adjacent to the opposite end of said carriage and having lugs extending toward said first end; a generally horizontal axle extending through and rotatably mounted within said lugs; wheels fixed to the ends of said axle; pivotal supporting means adjacent to the midsection of said yoke, whereby said yoke and said axle may rock about a substantially horizontal axis relative to said carriage; and a blowpipe holder mounted on said carriage adjacent to said first end of said carriage.

15. Blowpipe mounting means as claimed in claim 11 including locking screws cooperative with said clamps, to lock said clamps in adjusted positions on said blowpipe body and said arm respectively.

16. Blowpipe mounting means as claimed in claim 11 including a protractor scale and index associated with said pivotally adjustable clamps for indicating the angle included between said blowpipe body and said arm.

FRANK C. GEIBIG.